United States Patent [19]

Watson

[11] Patent Number: 5,567,245
[45] Date of Patent: Oct. 22, 1996

[54] METHOD FOR SEPARATING VINYLIDENE CHLORIDE POLYMER FROM OTHER POLYMERS

[76] Inventor: Dana L. Watson, 1921 10th St., Wichita Falls, Tex. 76301

[21] Appl. No.: 343,200

[22] Filed: Nov. 22, 1994

Related U.S. Application Data

[63] Continuation-in-part of Ser. No. 29,898, Mar. 11, 1993, abandoned, which is a continuation-in-part of Ser. No. 655,300, Feb. 14, 1991, Pat. No. 5,225,045.

[51] Int. Cl.$^6$ ........................................... B08B 3/04
[52] U.S. Cl. .................... 134/7; 134/2; 134/29; 134/33; 427/155; 427/242; 209/2; 209/3; 209/4
[58] Field of Search .................... 134/2, 7, 29, 33; 427/155, 242; 209/2, 3, 4

[56] References Cited

U.S. PATENT DOCUMENTS

| | | | |
|---|---|---|---|
| 3,317,519 | 5/1967 | Lazarus et al. | 260/239.3 |
| 3,654,940 | 4/1972 | Ritzi | 134/2 |
| 3,865,628 | 2/1975 | Callahan et al. | 134/2 |
| 3,932,693 | 1/1976 | Shaw et al. | 428/518 |
| 4,038,473 | 7/1977 | Cohen | 134/2 |
| 4,498,934 | 2/1985 | Potts | 134/29 |
| 4,617,111 | 6/1985 | Grimm et al. | 209/4 |
| 4,760,717 | 8/1988 | Ponzielli | 68/181 R |
| 4,830,188 | 5/1989 | Hannigan et al. | 209/3 |
| 4,838,948 | 6/1989 | Bailey | 134/8 |
| 4,844,351 | 7/1989 | Halloway | 241/19 |
| 4,904,309 | 2/1990 | Komabashiri et al. | 134/42 |
| 4,976,808 | 12/1990 | Ogasawara | 156/638 |
| 5,061,735 | 10/1991 | Zielinski | 521/46.5 |
| 5,110,055 | 5/1992 | Teeney | 241/15 |
| 5,194,109 | 3/1993 | Yamada | 156/94 |
| 5,225,045 | 7/1993 | Watson | 162/4 |

OTHER PUBLICATIONS

Vinylidene Chloride Polymers, vol. 17, p. 499.

*Primary Examiner*—Jill Warden
*Assistant Examiner*—Sharidan Carrillo
*Attorney, Agent, or Firm*—Geoffrey A. Mantooth

[57] ABSTRACT

A method for separating a polymer such as polypropylene from a layered plastic material that includes a layer of polypropylene together with a layer of vinylidene chloride is provided. The layered plastic material is agitated in a bath of water and sand to wet the surfaces of the material. The layered plastic material is then agitated in a wash liquor of hot water, caustic, sand, and a surfactant to crack and strip the vinylidene chloride material from the polypropylene material. Sufficient caustic is included in the wash liquor to raise the pH of the wash liquor to pH 12 or greater. Agitation is by reversibly rotating a perforating basket containing the layered plastic material and the wash liquor at 10–20 revolutions per minute and by blowing air into the basket. The wash liquor and stripped vinylidene chloride are then drained away from the polypropylene. The polypropylene is rinsed with water to wash away residual wash liquor and stripped vinylidene chloride. Water is extracted from the rinsed polypropylene, which then may be extruded for reuse.

13 Claims, 1 Drawing Sheet

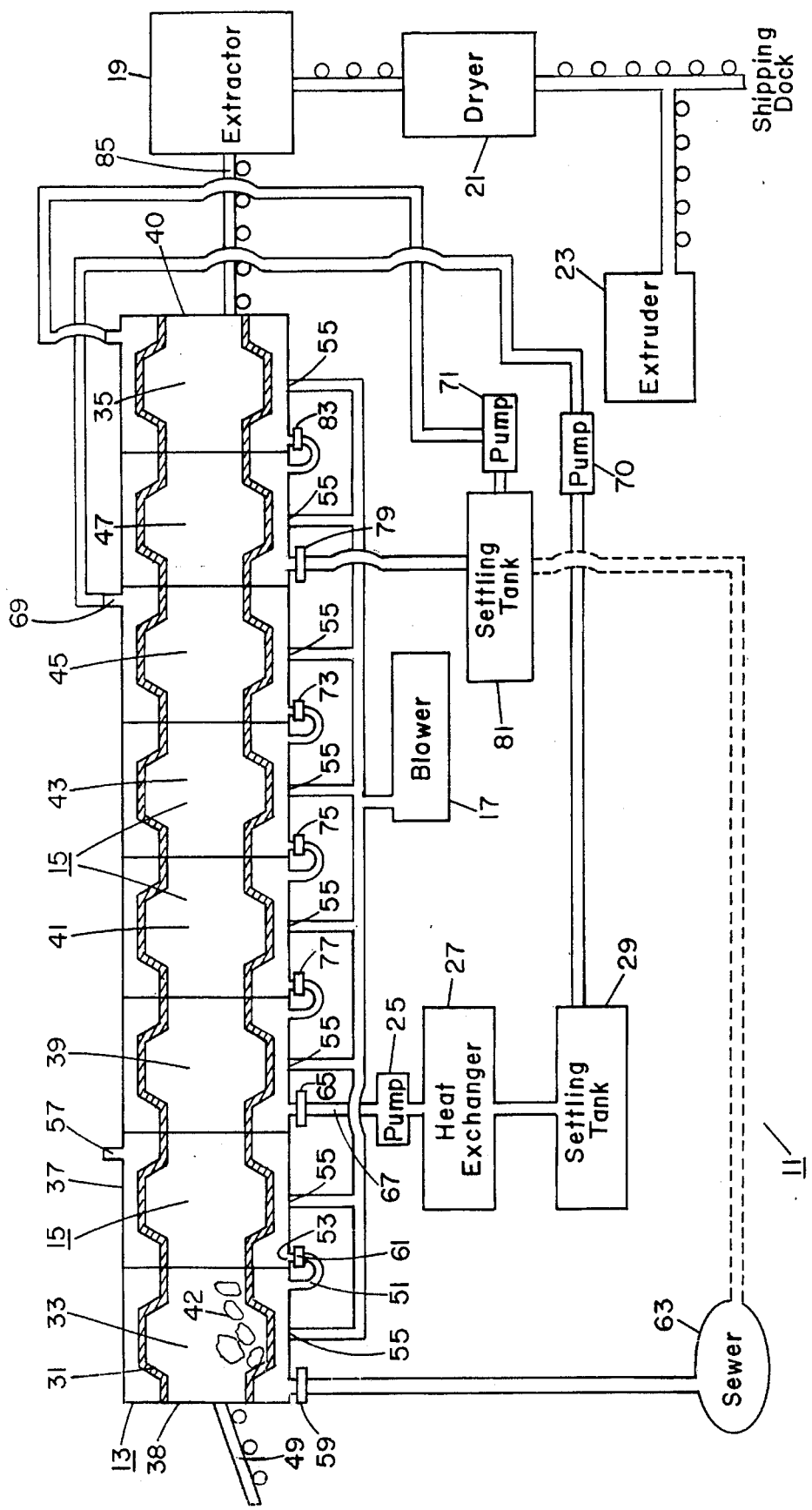

METHOD FOR SEPARATING VINYLIDENE CHLORIDE POLYMER FROM OTHER POLYMERS

The application is a continuation-in-part of my application Ser. No. 08/029,898, filed Mar. 11, 1993, now abandoned, which is a continuation-in-part of application Ser. No. 07/655,300, filed Feb. 14, 1991, now U.S. Pat. No. 5,225,045.

FIELD OF THE INVENTION

The present invention relates to a method for separating polymeric vinylidene chloride from other polymers, such as polypropylene.

BACKGROUND OF THE INVENTION

Polypropylene and polymeric vinylidene chloride ("VDC") may be combined to form sheets or films of clear, flexible plastic. The polypropylene and VDC are co-extruded together. The VDC has a relatively low gas permeability and forms a barrier to oxygen. Polypropylene and VDC film is commonly used to wrap and display food products such as cheese and meat. The film provides a seal about the food to assure a longer shelf life of the product. In addition, the film is transparent so that a prospective customer may view the enclosed product.

In the production of polypropylene-VDC film, large quantities of mill scraps of the film are generated as waste. The mill scraps present a disposal problem because the VDC layer is not easily separable from the polypropylene layer. The mill scraps cannot be recycled unless the polypropylene can be separated from the VDC. The mill scraps also cannot be placed in a landfill since the plastic material is non-biodegradable. Typically, mill scraps of polypropylene-VDC material are stored in warehouses because no satisfactory method exists for separating the polypropylene and the VDC.

In addition, VDC is used with other polymers besides polypropylene. For example, VDC can be used as the core layer of a multilayer packaging film. The outer layers of the film contain a polymer such as high-density polyethylene (HDPE). Also, VDC is used as a barrier layer in rigid containers for food packaging. For example, VDC forms an inner barrier layer, with the outer layers being formed of polypropylene, polystyrene, high-impact polystyrene (HIPS), or some other polymer with good mechanical properties, but poor barrier properties. Such rigid sheets are co-extruded.

Therefore, there exists a need for a method of efficiently separating VDC from other polymers so that the polymers may be recycled.

SUMMARY OF THE INVENTION

It is an object of the present invention to provide a method for separating a polymer such as polypropylene from a layered plastic material having a vinylidene chloride layered.

A layered plastic material has a layer of a first polymer and a layer of vinylidene chloride. The layered plastic material is provided in a wash liquor having water of between 170–200 degrees Fahrenheit, a surfactant and a pH of 12 or greater. The plastic is agitated in the wash liquor with an abrasive material so as to strip the vinylidene chloride from the first polymer. The wash liquor and stripped polymeric vinylidene chloride are removed from the first polymer.

In one aspect of the invention, the pH level of the wash liquor is adjusted with caustic to pH 12 or greater. In a further aspect of the invention, a washing machine is provided having a basket that is perforated so that water and residual vinylidene chloride may pass through the perforations while the first polymer is retained in the basket. The layered plastic material is loaded into the basket, followed by water and sand. The basket is moved to agitate the plastic material in the water and sand to wet the surfaces of the plastic material. A wash liquor comprising hot water, caustic, sand, and a surfactant is then loaded into the basket together with the wetted plastic material. The basket is then moved to agitate the plastic material in the wash liquor to strip the vinylidene chloride away from the first polymer. The wash liquor and the stripped vinylidene chloride are drained through the basket while the first polymer material is retained in the basket.

Upon completion of separation of the first polymer from the vinylidene chloride the first polymer may be readied for recycling. The first polymer (for example, polypropylene) is rinsed and dried, and then extruded into new product.

The present invention uses a combination of chemical, thermal and mechanical processes to strip the VDC off of the polypropylene. The chemical process involves washing the laminate in a high pH wash liquor. The thermal process involves using hot (170–200 degrees Fahrenheit) water. The mechanical processes involve agitating the laminate in the wash liquor, together with sand. The sand abrades the VDC off of the polypropylene. The laminate is agitated at a slow speed (10–20 rpms) in a washing machine basket so as to derive full mechanical action from the basket. Higher speeds tend to cause the plastic to bunch up against the walls of the basket. Also, air is blown in from the bottom of the basket to further increase agitation.

BRIEF DESCRIPTION OF THE DRAWINGS

The FIGURE is a schematic diagram of processing equipment used to practice a preferred embodiment of the method of the present invention.

DESCRIPTION OF THE PREFERRED EMBODIMENTS

The method of the present invention involves the recycling of layered plastic materials such as polypropylene with a vinylidene chloride (VDC) polymer backing. Polypropylene layered with VDC is used to wrap and display food products such as cheese and meat. The polymer chain of VDC is made up of vinylidene chloride units added head-to-tail:

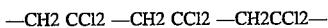

The present method is particularly useful for processing waste material such as mill scraps so that the polypropylene layer may be recycled.

Alternatively, the present invention can be used to separate VDC from other polymers, such as high-density polyethylene (HDPE), polyethylene, polystyrene, high-impact polystyrene (HIPS), etc.

The polypropylene layer is separated from the VDC layer with the present invention. In an initial step each sheet of polypropylene and VDC material is thoroughly wetted and separated from other sheets of material. The material is then separated into its respective polypropylene and VDC components using a combination of chemical, thermal and mechanical processes. The separated VDC is then removed as waste. The polypropylene is retained and rinsed with water to remove any remaining VDC and the stripping chemicals. The rinsed polypropylene is then dried and shuttled to an extruder where it may be reused.

In FIG. 1, there is shown a schematic view of a system 11 of processing equipment used to practice the method of the present invention, in accordance with a preferred embodiment. The system 11 includes a washing machine 13 having multiple chambers 15, a blower 17, an extractor 19, a dryer 21, and an extruder 23. A drain pump 25 pumps water and waste VDC material from the washing machine 13 into a heat exchanger 27 which carbonizes the waste VDC material. The heat exchanger 27 is coupled to a settling tank 29 where the carbonized waste VDC material is allowed to settle out of the water.

The washing machine 13 is a continuous batch washing machine generally similar to the washing machine described in U.S. Pat. No. 5,225,045, which is incorporated by reference herein. The washing machine has plural modular chambers 15 for washing material therein. The chambers 15 are waterproofed so as to hold wash water located in the chambers. The chambers 15 are arranged side by side along a longitudinal axis that extends through the washing machine 13.

A basket 31 is located in each chamber 15 for holding the material to be recycled. Each basket 31 is perforated with numerous openings. The openings allow water, broken up VDC material, and other waste material to be drained from the baskets. The openings are sized to retain the polypropylene material inside the baskets 31.

The baskets 31 may be rotated in the chambers 15 by a washing machine motor in order to agitate the material located in the baskets. Agitation of the material increases the effectiveness of the wash. The baskets are rotated about 240 degrees in one direction and then about 240 degrees in the other direction. Reversal of rotational direction of the baskets increases agitation of the material. In a preferred embodiment, the baskets are rotated at a speed of about 10–20 revolutions (partial revolutions) per minute and preferably at about 15–17 revolutions per minute.

The blower 17 provides air to all of the chambers.

The chamber 15 and the basket 31 of each chamber communicate with the adjacent chambers 15 and baskets 31 so that the material may move from a basket of one chamber to the basket of another chamber. The baskets are rotated beyond 300 degrees to cause the material located in one basket to be placed in a conventional scoop that locates the material in the next basket. In this manner, the material advances from one basket to the next.

The material moves successively through the washing machine from a first chamber 33 to a last chamber 35. Material is introduced into the basket of the first chamber 33 through a washing machine inlet 38. The material proceeds from chamber to chamber through the washing machine 13 upon completion of each washing cycle. Each chamber performs a separate washing cycle. Separated polypropylene material exits the washing machine 13 through an outlet 40 that communicates with the last chamber 35.

In a preferred embodiment, the washing machine has eight chambers 15. The first two chambers 33 and 37 are used to wet and separate the material to be recycled. The third, fourth, fifth and sixth chambers 39, 41, 43, and 45 are used to crack the VDC material off of the polypropylene and to separate the polypropylene from the VDC material. The last two chambers 47 and 35 are used to rinse the polypropylene material which by then is separated from the VDC. However, a fewer or greater number of chambers can be utilized.

The method of the invention will now be described. The polypropylene-VDC material 42 to be recycled is initially loaded into the basket 31 of the first chamber 33. Because the material is typically mill scraps from a manufacturing process, the material will be in small pieces or narrow strips. Also, the material will be unsoiled by consumer use. However, the method of the present invention can be used on soiled large pieces of material, such as post consumer waste. In such a case, the material is shredded to produce small size pieces (for example, ⅛–100 square inches) and washed to remove soil. Washing can occur in another washing machine by using water, surfactant and alkali. If the VDC layer forms a core layer so that the VDC layer is not exposed, then the material is ground to produce small pieces so as to expose at least some of the VDC. For example, the material can be ground to form pieces that are less than ½ square inches.

To locate the material into the first chamber 33, the material is located onto an input conveyor 49 which loads the material into the first chamber 33 through the washing machine inlet.

The pieces of polypropylene-VDC material are separated and wetted in a wash cycle in the first chamber 33. There the material is mixed with a slurry comprised of water and sand (or grit). The water is warm water (70–100 degrees Fahrenheit) from a water inlet 51. As shown, the water inlet 51 may be connected to a drain opening 53 of the second chamber 37 so that water may flow from the second chamber 37 to the first chamber 33. Alternatively, the water inlet 51 may be connected to a separate water source. As the basket rotates, the water wets all exposed surfaces of the pieces of material 42.

The sand forms a slurry with the water in the first chamber 33. The sand assists in separating the strips of material when the material is agitated with the sand so that each piece of material may be thoroughly wetted. The sand could be of the type typically used in sand blasting, and preferably is coarse grained. For example, I have used a type of sand that is commonly used in children's sand boxes and has a particle size of about 1 millimeter. The sand travels with the plastic material through the washing machine from the first chamber through the seventh chamber where it is rinsed from the material. The perforations in the baskets of the first six chambers are sized to retain the sand within the baskets while allowing water and wastes to drain through the baskets. In a preferred embodiment, the baskets 31 within the first six chambers (33, 37, 39, 41, 43, and 45) are formed of a stainless steel wire mesh with a wire diameter of 0.010 inches and having 40 wires per inch.

The basket in the first chamber 33 is rotated back and forth around its longitudinal axis to agitate the material in the slurry of water and sand. While being agitated, strips of material that are stuck together become separated. The surfaces of the separated strips of material are exposed to the water in the chamber and become wet.

Air is injected into the first chamber 33 by the blower 17 through an air inlet 55 located near the bottom of the chamber 33. The air bubbles up from the bottom of the chamber 33 to enter the basket and further increases agitation of the material. The wash time is shortened by the increased agitation provided by the blowing of air into the chamber 33. In a preferred embodiment, the blower 17 provides 200–500 cubic feet of air per minute at about 5 psig to the washing machine 13.

After the polypropylene-VDC material has been washed for a predetermined period of time in the basket 31 in the first chamber 33, the basket 31, in conjunction with the other baskets in the washing machine 13, is rotated past 300 degrees in order to transfer the material to the second chamber 37. In a preferred embodiment, the material is washed in the first chamber 33 and every subsequent chamber 15 for a period of two to five minutes.

Because the washing machine 13 is of the continuous type, the basket 31 in the first chamber 33 is loaded with new material each time after it empties into the second chamber 37. This maintains a continuous flow of material through the system 11. The operation of the input conveyor 49 is intermittent, operating only when the first chamber 33 needs to be loaded with material. Alternatively, the method of the present invention could be carried out by a single chamber washing machine, wherein the material stays in the same basket throughout the various process steps.

The second chamber 37 operates in the same manner as the first chamber 33 with an identical slurry of sand and warm water to further ensure that the strips of material are thoroughly separated and wetted.

The water in the first and second chambers 33 and 37 may be drained and replaced with fresh water after each wash cycle. Fresh water from a water source may be placed into the second chamber 37 through water inlet 57 after each wash cycle. At the end of the wash cycle, while fresh water is being introduced into the second chamber 37, drain valves 59 and 61 may be opened. Drain valve 61 drains water from the second chamber 37 into the first chamber 33 through water inlet 51. Drain valve 59 drains water from the first chamber 33 to a sewer 63. This provides a flow of wash water which is counter or opposite to the flow of material from the first chamber 33 to the second chamber 37, where the dirtiest water is drained to the sewer 63 after each wash cycle. This counterflow conserves water. However, since mill scraps of polypropylene-VDC material are not usually dirty or soiled, the water in the first and second chambers may be retained in the chambers for successive wash cycles to better conserve water.

Upon completion of the wash cycle in the second chamber 37 the separated and wetted polypropylene-VDC material and the sand are placed in the basket of the third chamber 39. There, the material is mixed with a wash liquor comprised of hot water, caustic, sand, and a surfactant. The water is hot, having a temperature of about 170–200 degrees Fahrenheit. Care must be taken not to overheat the water because the polypropylene portion of the material may start to degrade at temperatures (240° F. and above) that are hotter than the boiling point of water. (If the VDC is layered onto a polymer other than polypropylene, care must be taken not to use water that is so hot as to degrade the particular polymer that is being recovered from the VDC for recycling. A sufficient mount of caustic is added to raise the pH of the mixture to a desired level. The pH of the wash liquor should be sufficient to counterbalance the acidic pH of the vinylidene chloride component of the material, which is approximately pH 2. In a preferred embodiment, sufficient caustic is added to raise the pH level of the mixture to 12 or greater. The caustic, preferably, is sodium hydroxide, however, other caustic materials such as sodium orthosilicate, sodium metasilicate, soda ash, and sodium peroxide may be used. The surfactant is a non-ionic liquid detergent having a neutral pH. The sand forms a slurry with the other components of the wash liquor.

The basket in the third chamber 39 is rotated about its longitudinal axis to agitate the material in the wash liquor. The VDC component of the material is cracked and separated from the polypropylene component of the material by thermal, chemical, and mechanical action within the third chamber 39. The high temperature of the water causes thermal degradation of the VDC, while the caustic chemically reacts with the VDC to degrade the VDC. Degradation of the VDC is easily visible since the degraded VDC changes from a clear material to brown, and finally to black as the degradation proceeds. The color of the VDC provides an indication of the effectiveness of the degradation process. The darker or blacker the VDC, the more effective the degradation process. To further darken the VDC, additional caustic can be added to the wash liquor. It is believed that the chemical degradation of the VDC causes the VDC layer of the material to physically stretch and crack. It is also believed that the agitation of the material by the rotating basket causes the cracked VDC layer to be worked off of or separated from the polypropylene material. The agitated sand scours the polypropylene material to work the cracked VDC material off of the polypropylene. The detergent or surfactant holds the separated VDC material in solution, preventing the degraded VDC material from reattaching to the polypropylene.

Air provided by the blower 17 bubbles up from the bottom of the third chamber 39 to enter the basket and further increases the agitation of the mixture, thereby assisting in the separation of the VDC from the polypropylene. The increased agitation provided by the air also serves to mix the chemicals in the wash liquor faster, causing rapid displacement of the chemicals through the wash liquor and into the material. Wash times are shortened by the blowing of air into the chamber 39. Furthermore, blowing air into the chamber 39 from outside the basket 31 prevents the basket perforations from clogging with waste VDC material.

After the material has been washed a predetermined time, for example 2–5 minutes, a dump valve 65 is opened, allowing the third chamber 39 and its basket to drain. The 0.010 inch diameter, 40 wires per inch wire mesh basket retains the polypropylene material and sand within the basket while allowing the wash liquor containing the degraded waste VDC material to drain through the basket and into the drain 67.

The drained wash liquor and waste VDC material flows from the dump valve 65 into drain pump 25. The wash liquor and waste VDC material are pumped into the heat exchanger 27 by the drain pump 25. The heat exchanger efficiently exchanges heat from steam provided by a boiler to the wash liquor containing the VDC waste material. The heat exchanger 27 may be of the type shown in U.S. Pat. No. 5,228,515, which is incorporated herein by reference. In a preferred embodiment, the heat exchanger is formed of stainless steel, copper or brass so that the heat exchanger is resistant to the corrosive effects of the caustic in the wash liquor. The heat exchanger 27 heats the wash liquor and the VDC waste material to a temperature of about 600 degrees Fahrenheit in order to carbonize the VDC waste material. Thus, the VDC is cooked at a high temperature, causing it to turn blacker still. In addition, the carbonized VDC becomes brittle and heavy with respect to water. The wash liquor containing the carbonized VDC waste is then moved from the heat exchanger to one or more settling tanks 29. The carbonized VDC waste settles to the bottom of the settling tank 29. The wash liquor can then be removed for reuse or for disposal. The VDC waste is removed from the tank for disposal.

In another embodiment, the drain pump 25 pumps the wash liquor containing the VDC waste material directly to the settling tank 29. The VDC waste material settles to the bottom of the settling tank 29. Superheated steam from a boiler is periodically bubbled through the VDC waste from beneath the settling tank 29. The superheated steam has a temperature of about 600 degrees Fahrenheit. The steam carbonizes the VDC material in the settling tank 29.

In still another embodiment, the VDC is settled out of the drained wash liquor by mixing hydrogen peroxide into the drained wash liquor. For example, a 50% solution of hydrogen peroxide is used. Two quarts of this hydrogen peroxide solution is added to 100 gallons of the waste water.

In still another embodiment, chlorine is added to the waste water to remove the VDC. 2 quarts of chlorine (bleach) are added to 100 gallons of the waste water.

When the wash liquor and waste VDC material are drained from the third chamber 39, the basket of the third chamber is rotated past 300 degrees to transfer the polypropylene material and sand to the basket in the fourth chamber 41. The fourth, fifth, and sixth chambers 41, 43, and 45 sequentially perform washing operations on the material to strip any remaining VDC from the polypropylene. The washing operations of the fourth, fifth, and sixth chambers are identical to the wash of the third chamber 39 discussed above. The polypropylene is completely stripped of VDC after the wash cycle in the sixth chamber 45.

The wash liquor for the third, fourth, fifth, and sixth chambers 39, 41, 43, and 45 flows from the sixth chamber 45 to the third chamber 39 counter to the movement of the material through the washing machine 13. This counterflow conserves the wash liquor. The wash liquor is placed in the sixth chamber through inlet 69. Wash liquor may be recovered from the settling tank 29 and pumped back into the washing machine 13 through inlet 69 by a pump 70. The wash liquor can be added to either the top or the bottom of the chamber. After each wash cycle, valves 73, 75, and 77 are opened to allow wash liquor to flow respectively from the sixth chamber to the fifth chamber, from the fifth to the fourth chamber, and from the fourth to the third chamber. The wash liquor in the third chamber, which contains the most VDC waste material, is drained through the dump valve 65 as described above. Alternatively, the waste water from each chamber 41, 43, 45 can be drained to either the heat exchanger 27 or the settling tank 29.

Upon completion of the wash cycle in the sixth chamber 45 the stripped polypropylene material and the sand are transferred to the basket in the seventh chamber 47 of the washing machine 13. There, the polypropylene material is rinsed with warm water (140 degrees Fahrenheit) to remove the sand, any caustic, and any remaining VDC material. The basket is rotated and air is bubbled into the chamber to agitate the polypropylene material in order to enhance the removal of sand, caustic and VDC from the polypropylene material. The baskets of the seventh and eighth chambers 47 and 35 have a larger mesh size than the baskets of the first six chambers so that the sand may be washed through the basket.

After the material has been rinsed a predetermined time, preferably 2–5 minutes, a drain valve 79 is opened, allowing the seventh chamber 47 and its basket to drain. The basket retains the polypropylene material while the water, sand and any caustic and VDC material are washed through the drain valve 79.

The drained water, sand and other materials are drained to a settling tank 81. The sand is allowed to settle out of the bottom of the settling tank 81. The water in the settling tank may be cleaned and purified for reuse. In another embodiment, the drained water, sand and other materials from the seventh chamber 47 are drained to a sewer 63.

When the water, sand and other residual materials are drained out of the seventh chamber 47, the basket containing the polypropylene material is rotated over 300 degrees to transfer the material to the basket of the eighth and last chamber 35. The eighth chamber 35 operates in the same manner as the seventh chamber to ensure that the polypropylene material is thoroughly rinsed and cleansed of other materials.

Fresh rinse water flows from the eighth chamber 35 to the seventh chamber 47. After each wash cycle, fresh rinse water is placed in the eighth chamber 35. Valve 83 located at the bottom of the eighth chamber 35 is opened at the end of each wash cycle and the water in the eighth chamber 35 flows from the eighth chamber 35 to the seventh chamber 47. As described above, the water in the seventh chamber 47 is drained through drain valve 79.

Upon completion of the rinse cycle in the eighth and last chamber the stripped and cleaned polypropylene is dumped onto an outlet conveyor or shuttle 85 by rotating the last basket beyond 300 degrees. The output conveyor 85 loads the polypropylene material into the extractor 19. The extractor 19 is a conventional, commercially available centrifugal extractor although other types of extractors can be used. The extractor 19 extracts the moisture out of the polypropylene material. The extractor 19 is modified by fitting it with the same type of mesh screening used to form the baskets. As the extractor spins the polypropylene, the screening retains the polypropylene inside the working volume of the extractor. Water is spun out of the polypropylene by the extractor and passes through the mesh.

After being pressed in the extractor 19, the polypropylene can be loaded into the dryer 21 to remove any moisture. The dryer 21 is a conventional, commercially available device that has been modified. The dryer has a rotating basket. The modification of the dryer provides a mesh screen similar to the mesh screen used in the extractor that is coupled to the inside of the basket. The mesh screen retains the polypropylene inside of the basket during operation of the dryer. Care must be taken not to use the excessive heat to dry the polypropylene since the polypropylene will degrade at temperatures exceeding 239 degrees Fahrenheit.

After being completely dried in the dryer the polypropylene may be loaded for shipment to a processing plant, or may be loaded into an extruder 23 for reuse. The extruder 12 is a conventional, commercially available device for extruding polypropylene.

Although the disclosed washing machine of the preferred embodiment is a continuous batch washing machine having eight modular chambers, the method of the present invention may be practiced on other washing machines. For example, a continuous batch washing machine having four modular chambers may be used, where the first chamber is used to separate and wet the polypropylene-VDC material, the second and third chambers are used to strip the VDC material from the polypropylene, and the fourth chamber is used to rinse the polypropylene. Furthermore, the method of the present invention may be practiced on a conventional, one chamber multi-cycle washing machine where each step of the method may be practiced in separate cycles of the machine.

Although the preferred embodiment has been described as using sand to assist in removing the VDC from polymer layers, other abrasive materials can be used. For example, corn cobs, either whole or chopped, could be used. Also, the inside of the walls on the respective baskets could be fitted with sheets of graters. The grater sheets have sharp edge slits or perforations. The sharp edges extend into the basket interior. The grater sheets extend into the basket interior. The grater sheets are coupled to the walls of the basket.

The foregoing disclosure and the showings made in the drawing are merely illustrative of the principles of this invention and are not to be interpreted in a limiting sense.

I claim:

1. A method of processing a layered plastic material having a layer of a first polymer and a layer of a second polymer wherein said second polymer comprises vinylidene chloride so as to separate said first polymer from said vinylidene chloride, comprising the steps of:

providing said layered plastic material in a wash liquor, said wash liquor comprising water having a temperature of 170–200 degrees Fahrenheit, and a surfactant, said wash liquor having a pH of 12 or greater;

agitating said layered plastic material in said wash liquor and with an abrasive material so as to strip said vinylidene chloride from said first polymer;

removing said wash liquor and said stripped vinylidene chloride away from said first polymer.

2. The method of claim 1, wherein said step of providing said layered plastic material in a wash liquor further comprises the step of adjusting the pH level of said wash liquor to pH 12 or greater with caustic.

3. The method of claim 1, further comprising the steps of:

providing at least one basket for containing said layered plastic material;

said step of agitating said layered plastic material in said wash liquor further comprises the step of moving said basket containing said layered plastic material by reversibly rotating said basket at a speed of 10 to 20 revolutions per minute to agitate said material, and blowing air into said basket to further agitate said material;

after said step of removing said wash liquor and said stripped vinylidene chloride away from said first polymer of said material, rinsing said first polymer with water to wash any remaining wash liquor and stripped vinylidene chloride from said first polymer; and extracting water from said rinsed first polymer.

4. The method of claim 1, wherein said step of providing said layered plastic material in a wash liquor further comprises the step of providing said layered plastic material with said first polymer comprising polypropylene.

5. The method of claim 1 wherein said step of providing said layered plastic material in a wash liquor further comprises the step of providing sand as said abrasive material in said wash liquor.

6. The method of claim 1 wherein said layered plastic material is in small pieces of between 1/8–100 square inches in size.

7. The method of claim 5 further comprising the steps of:

providing a perforated, ribbed basket for containing said layered plastic material;

said step of agitating said layered plastic material in said wash liquor and with an abrasive material further comprises the step of reversibly rotating said basket at a speed of 10–20 revolutions per minute.

8. The method of claim 1 further comprising the steps of:

providing a perforated, ribbed basket for containing said layered plastic material;

said step of agitating said layered plastic material in said wash liquor and with an abrasive material further comprises the step of reversibly rotating said basket at a speed of 10–20 revolutions per minute.

9. A method of processing a layered plastic material having a polypropylene layer with a polymeric vinylidene chloride layer, comprising the steps of:

providing a washing machine having a basket that is perforated so as to pass water and said polymeric vinylidene chloride therethrough after said layered plastic material has been processed while retaining said polypropylene inside said basket;

wetting said layered plastic material by rotating said basket so as to agitate said layered plastic material in water and sand;

washing said layered plastic material by rotating said basket so as to agitate said layered plastic material in a wash liquor comprising hot water between 170–200 degrees Fahrenheit, caustic, sand, and a surfactant, said wash liquor having a pH of 12 or greater, to strip said polymeric vinylidene chloride layer away from said polypropylene material; and draining said wash liquor and said stripped vinylidene chloride material through said basket while retaining said polypropylene material in said basket.

10. The method of claim 9, wherein said step of washing said layered plastic material by moving said basket so as to agitate said layered plastic material in a wash liquor, further comprises the step of blowing air into said basket to further agitate said plastic material.

11. The method of claim 10, further comprising the step of:

after draining said wash liquor and said stripped vinylidene chloride layer through said basket away from said polypropylene layer, rinsing said polypropylene layer with water to remove any residual wash liquor and stripped vinylidene chloride.

12. The method of claim 11, further comprising the step of:

after rinsing said polypropylene layer with water, extracting water from said polypropylene layer to dry said polypropylene layer.

13. The method of claim 9, wherein said step of washing said layered plastic material by moving said basket further comprises the step of reversibly rotating the basket at a speed of 10 to 20 revolutions per minute.

* * * * *